Dec. 21, 1954  E. W. ZEARFOSS, JR  2,697,331
REFRIGERATION APPARATUS WITH PLURAL EVAPORATORS
AND REFRIGERANT FLOW CONTROL
Filed Sept. 13, 1952  2 Sheets-Sheet 1

INVENTOR.
ELMER W. ZEARFOSS JR.
BY
Brown, Jerk & Synnestvedt
AGENTS

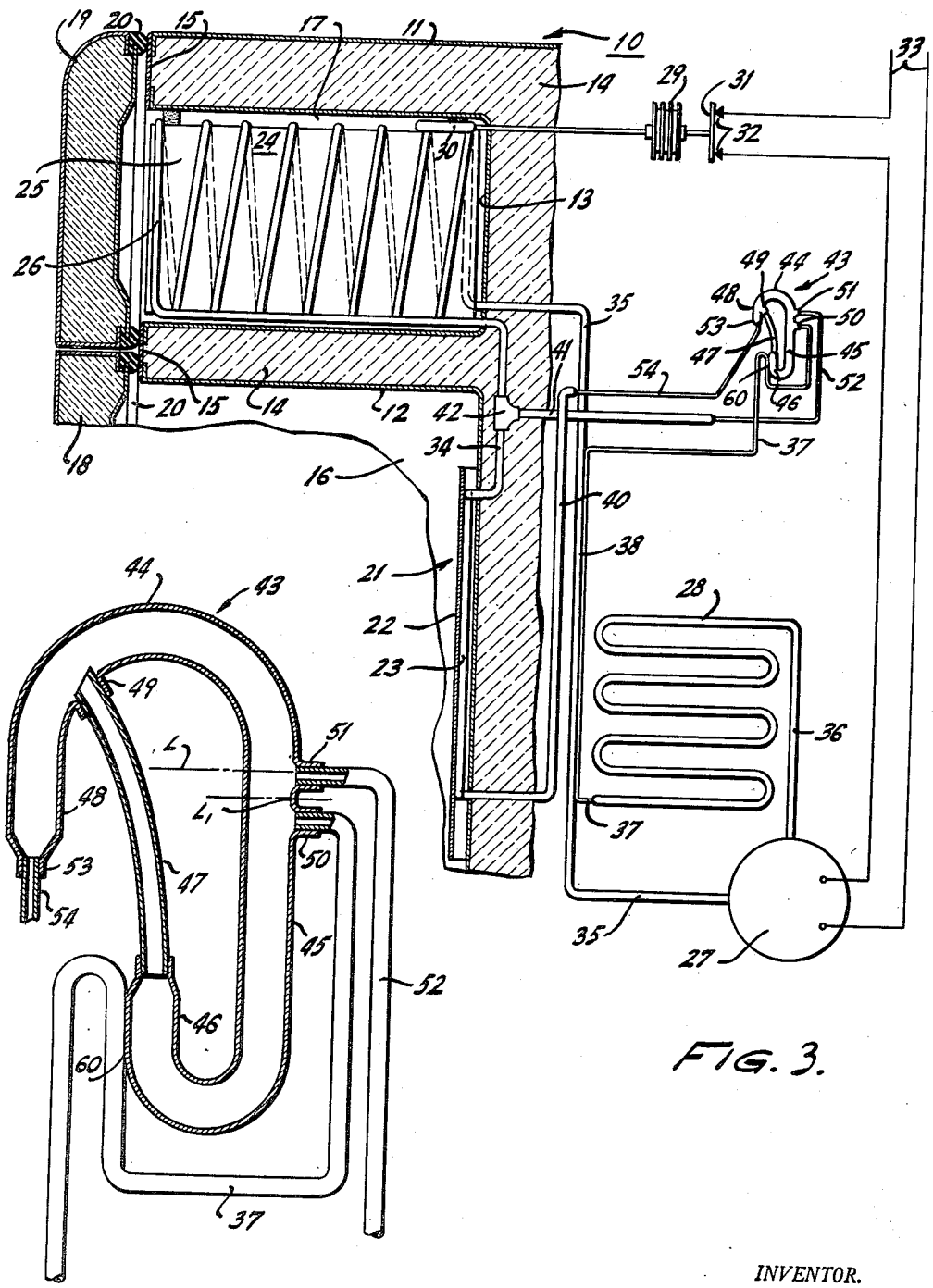

United States Patent Office 2,697,331
Patented Dec. 21, 1954

2,697,331

REFRIGERATION APPARATUS WITH PLURAL EVAPORATORS AND REFRIGERANT FLOW CONTROL

Elmer W. Zearfoss, Jr., Philadelphia, Pa., assignor to Philco Corporation, Philadelphia, Pa., a corporation of Pennsylvania Application September 13, 1952, Serial No. 309,435

12 Claims. (Cl. 62—3)

The present invention relates to refrigeration apparatus of the type including a refrigerator cabinet having a plurality of separate compartments and provided with a refrigerating system adapted to maintain said compartments at different temperatures. More specifically, the hereindescribed and claimed invention has to do with improvements in a refrigerating system of the above-mentioned general variety, said improvements principally residing in the provision of novel construction and association of circuit components which function to produce and to maintain desired temperature conditions within the separate compartments.

To insure proper and adequate refrigeration for various kinds of foods some of which must be kept in frozen condition and some of which must be cooled without freezing, it is customary to provide the interior of a refrigerator cabinet with two compartments. One compartment commonly called the "freezing compartment" is maintained within a sub-freezing temperature range (for example +5° to —10° F.) and is adapted for the storage of food to be kept in frozen condition. The other compartment commonly called the "cooling compartment" is maintained within a considerably higher and non-freezing temperature range (for example +34° to +40° F.) and is adapted for the storage of food to be cooled without freezing. A convenient refrigerating system which is suitable to maintain the proper and desired temperature range within each of the two separate compartments, incorporates two evaporators one arranged in heat exchange relation with the freezing compartment and the other arranged in heat exchange relation with the cooling compartment. These evaporators are connected through appropriate conduits with a compressor and a condenser to constitute a refrigerant circulating system, means being provided in the system to cause said evaporators to operate in such manner as to bring about the required temperature conditions in the respective compartments.

It is well recognized that the provision of a suitable simple refrigerating system capable of adequately maintaining proper temperatures within the two compartments, gives rise to unusual problems and difficulties in the manufacturing, operation and servicing of the refrigerator. Accordingly, it is a broad object of the invention to solve and to overcome these problems and difficulties, by providing a simple dependable arrangement which makes it possible to control the flow of refrigerant to the evaporators and to maintain the temperature of each compartment within the desired range, without recourse to such complicated control devices as thermostatically or electromechanically operated valves.

Another and more specific object of the invention has to do with a multi-evaporator system in which provision is made to cause liquid refrigerant to flow selectively to one or to another evaporator by the simple expedient of applying heat to a portion of the refrigerant circulating circuit of the system.

In achievement of the above general objectives and resulting advantages, the invention employs a refrigeration system including novel means adapted to separate liquid refrigerant and flash gas from the mixture which normally results due to the flow of refrigerant from the high pressure side to the low pressure side of the system. According to a preferred embodiment, the above-mentioned novel means is connected and associated with the refrigerant circulating system in such a manner that, under one condition, the separated liquid refrigerant flows to a first evaporator which is associated with the non-freezing compartment, and the flash gas flows to a second evaporator which is associated with the freezing compartment, and, under another condition, the flash gas flows to said first evaporator and the liquid flows to said second evaporator. In accordance with a modified embodiment of the invention, the mentioned liquid and flash gas separating means is connected and associated with the refrigerant circulating system in such a manner that the flow of liquid refrigerant to the evaporator associated with the non-freezing compartment is modulated to compensate for variations in cabinet temperatures due to changing room temperature conditions, and also to compensate for variations in the suction pressure within said system due mostly to changing refrigeration loads.

The characteristic features of the invention and the manner in which the above-recited and other objectives and advantages of the invention are best achieved, will clearly appear from the following description of the embodiments illustrated in the accompanying drawings, in which.

Figures 1, 2:
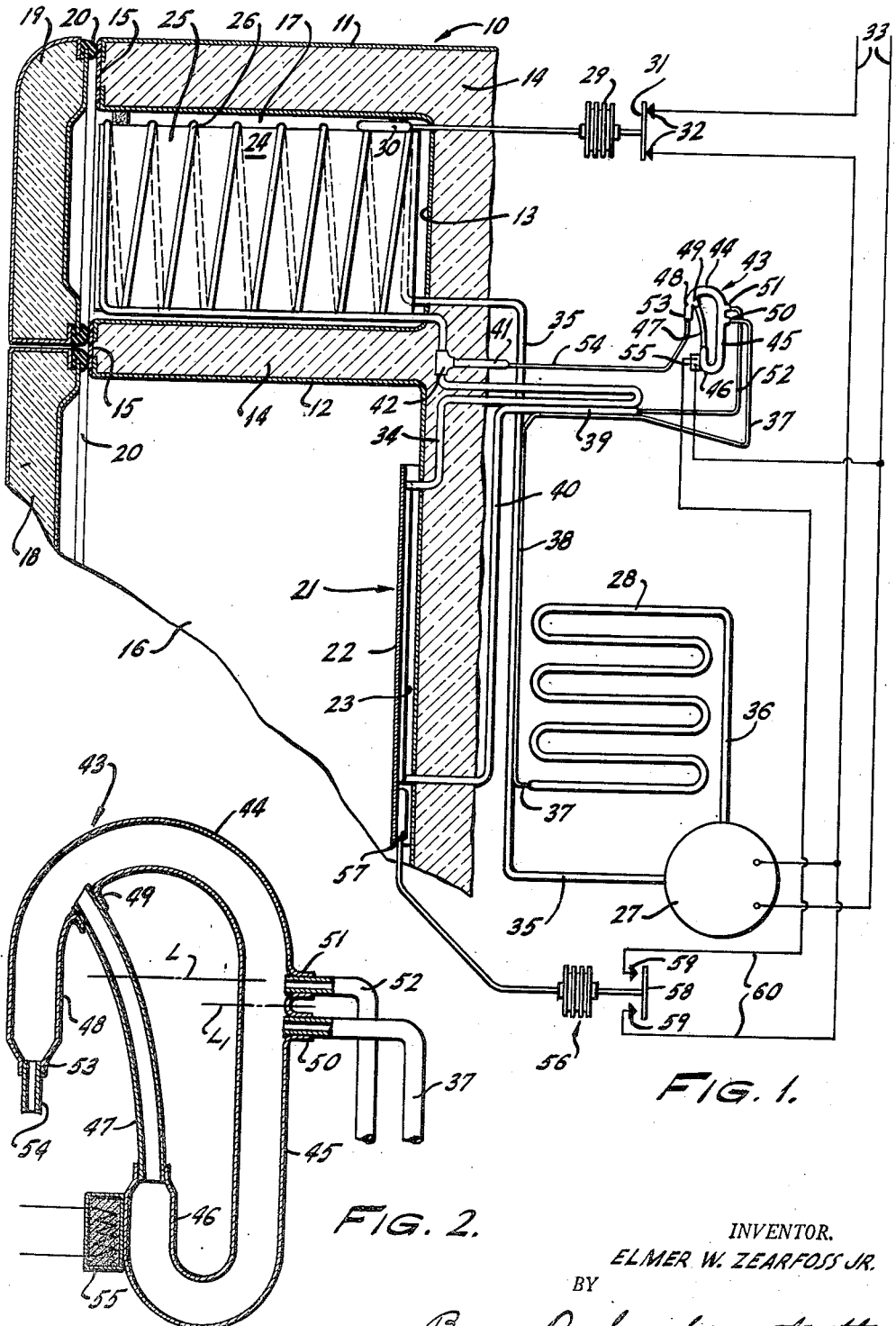
Figure 1 is a sectional view taken generally through the vertical mid-plane of a refrigerator provided with a refrigerating system constructed in accordance with a preferred form of the invention, certain elements of said system being diagrammatically shown.
Figure 2 is an enlarged sectional view of a part of the system shown in Figure 1; and, Figures 3 and 4 are views similar to Figures 1 and 2, respectively, and illustrate a refrigerating system constructed in accordance with a modified form of the invention.

With more detailed reference to the drawings, it will be seen that in the two forms illustrated in Figures 1 and 3, respectively, the invention is embodied in a domestic or household refrigerator which comprises a cabinet 10 having an outer shell 11 and a pair of inner liners 12 and 13, said shell and liners being spaced and insulated from each other by means of suitable insulation 14. As is customary breaker strips 15 of low thermal conductivity, extend about the forward edge of the cabinet and bridge the gaps between said outer shell and inner liners. These liners define two isolated zones which constitute a lower compartment 16 and an upper compartment 17. Insulated doors 18 and 19 of usual construction, including gasket strips 20, are employed to close the front access opening of each of said compartments, respectively.

The lower compartment 16 is utilized for the storage of food to be kept at cooling or non-freezing temperatures and according to usual practice is supplied with suitable shelves (not shown) for supporting the food. In the illustrated embodiments, this lower compartment is effectively cooled and maintained at cooling or non-freezing temperatures by means of an evaporator, generally designated at 21, which advantageously consists of a generally rectangular metallic sheet 22 provided with conduit means 23 for circulation of refrigerant in heat exchange relation with said sheet. The evaporator 21 is conveniently mounted in a vertical position close to the rear wall of the inner liner 12 and, in practice, extends along said rear wall and substantially from one to the other of the confronting sidewalls of said liner so as to present a comparatively large surface which is exposed to the air within the lower compartment.

The upper compartment 17 encloses an evaporator, generally designated at 24, which is in the convenient form of a box-like casing 25 having an open front and provided with conduit means 26 for circulation of refrigerant in heat exchange relation with said casing. The evaporator 24 is fitted within and occupies substantially the full space defined by the inner liner 13, and serves for the accommodation of ice trays and for the storage of frozen foods. For that purpose, the evaporator 24 is adapted to produce and to maintain sub-freezing temperatures within its casing 25.

As shown, the lower evaporator 21 and the upper evaporator 24 form parts of a refrigerating system which includes a motor-compressor 27 and a condenser 28. The on-and-off cycling of the motor-compressor is controlled by means of a customary bellows type device 29 having a feeler bulb 30 which, as illustrated in Figures 1 and 3, is arranged in heat exchange relation with the freezing evaporator 24 so that the temperature of the latter influences the operation of said device 29 to actuate a switch element 31 to open or to close contacts 32 in the electrical circuit 33 adapted to supply electrical energy to the motor-compressor. This control device is such that when the temperature of the freezing evaporator reaches the lower end of its predetermined operating temperature range, the switch element 31 is moved to open the circuit 33 and to de-energize the motor-compressor, and when the temperature of the freezing evaporator reaches the upper end of said range, said switch element is actuated to close said circuit and to energize the motor-compressor.

The two evaporators are interconnected in series flow circuit by means of a conduit 34 which leads from the outlet of the lower evaporator to the inlet of the upper evaporator. The outlet of the upper evaporator communicates through suction line 35 with the inlet side of the motor-compressor 27, the outlet side of which is connected with the inlet end of the condenser 28 through conduit 36. The outlet end of the condenser discharges into a restrictor or capillary tube 37 which, as is customary and as is represented at 38, has a portion arranged in heat exchange relation with a portion of the suction line 35.

In accordance with the present invention, the system includes two distinct feed line sections 40 and 41. The feed line section 40 leads to the inlet end of the lower evaporator, and the feed line section 41 is connected, as at 42, to the conduit section 34, at a point between the outlet of the lower evaporator and the inlet of the upper evaporator. Also in accordance with the invention, means generally designated at 43 is adapted to effect separation of flash gas and liquid refrigerant from the mixture which normally emerges from the restrictor or capillary tube 37. As illustrated in the drawings, the means 43 includes an inverted U-tube 44 one branch 45 of which is extended, as shown at 46, to communicate with a tubular section 47 opening into the other branch 48 of said inverted U-tube, as is represented at 49. As indicated at 50, said one branch 45 of the inverted U-tube is in open communication with the outlet end of the restrictor or capillary tube 37 and, as is represented at 51, is also in open communication with the inlet end of a capillary tube section 52. As shown at 53, the other branch 48 of said inverted U-tube is in open communication with the inlet end of a second capillary tube section 54. It is pointed out that, for clarity of illustration, the compressor-condenser unit and most of the conduits running between said unit and the evaporators are shown outside the refrigerator cabinet structure. However, it will be understood that in practice, said unit is conveniently housed in a machinery compartment as is usual, and that said conduits including the inverted U-tube device 43, are mounted in the cabinet insulation.

With particular reference to the form of the system illustrated in Figures 1 and 2, it will be noted that the outlet of the capillary tube section 52 is connected to the inlet end of the feed line section 40 which leads to the lower evaporator and that the capillary tube section 54 is connected to the feed line section 41 which leads to the conduit section 34 between the two evaporators. In the normal operation of this system, refrigerant compressed in the motor-compressor 27 and liquefied in the condenser 28, is fed into the inverted U-tube 44 through the capillary tube 37 which as previously noted opens in an upper portion of the one leg or branch 45 of said U-tube. In this U-tube, the mixture of flash gas and liquid refrigerant separates; the flash gas rises in the leg or branch 45 of said inverted U-tube, and the liquid refrigerant gravitates down said leg or branch and, because of hydrostatic pressure, rises in the extended portion 46 and the tubular section 47 to a level corresponding to the level of the liquid in said leg or branch 45. As indicated at L in Figure 2, the level of the liquid in said branch is normally up to the inlet of the capillary tube section 51 and that the level of the liquid in tubular section 47 is below the outlet of this tubular section. In this manner, liquid refrigerant accumulated in the leg or branch 45 of the inverted U-tube spills into said capillary tube section 52 and is fed directly through feed line section 40 into the lower evaporator 21. The flash gas which rises in the inverted U-tube, passes down the other leg or branch 48 of said U-tube and out through the capillary tube section 54 and the feed line section 41 into the conduit 34. In this conduit, the flash gas mixes with refrigerant passing out of the lower evaporator and the mixture flows through the upper evaporator. Expanded refrigerant is withdrawn from said upper evaporator through the suction line 35 back to the motor-compressor.

In accordance with the invention, the system as shown in Figures 1 and 2 is provided with means to modify the above-described normal flow of refrigerant through the evaporators when the temperature of the lower evaporator 21 exceeds the lower end of its predetermined operating range and to restore said normal flow of refrigerant when the temperature of said lower evaporator reaches the upper end of said predetermined range. This flow modifying means includes a heat generating element in the form of an electrical heater 55 disposed in heat exchange relation with the inverted U-tube so that upon energization of said heater, the inverted U-tube acts as a percolator or vapor lift device and causes liquid to percolate up the tubular section 47 and to spill into the leg or branch 48 of said U-tube. It will be understood that this percolation and spilling of liquid brings about a lowering of the liquid level in the leg or branch 45 to a point below the inlet end of the tube section 52, as is represented at $L_1$. As a result the flow of liquid through the lower evaporator 21 is interrupted and the liquid passes out from the inverted U-tube through the tube section 54 and the feed line 41 into the upper evaporator 24. Under this condition, it will be appreciated that flash gas is free to enter the tube section 52 and to pass through the lower evaporator. However, flash gas produces little refrigeration effect so that cooling of the lower evaporator is terminated so long as the modified flow condition exists. This condition continues until the temperature of the lower evaporator reaches the upper end of its predetermined operating temperature range, when the heater is automatically de-energized, thus restoring the normal flow of liquid refrigerant through said lower evaporator. Control of the heater is conveniently accomplished by means of a temperature-sensitive bellows type device 56. This device has its feeler bulb 57 arranged in heat exchange relation with said lower evaporator, and is adapted to actuate a switch element 58 to open or to close contacts 59 included in a secondary electrical circuit 60 which is tapped across the line of the main or motor-compressor circuit 33 and which is connected to the heater 55.

The system as above-described has the advantage that it provides for automatic defrost of the plate evaporator 21. It will be understood that in order to produce the desired temperatures (say +34° to +40° F.) within the storage compartment 16, it is necessary that the plate evaporator itself operates at lower temperatures. In practice, the plate evaporator is caused, cyclically, to "pull down" to a predetermined minimum temperature, for example 0° F., and thereafter to rise to a predetermined maximum temperature slightly in excess of the freezing point of water, for example 36° F. This cyclic operation is obtained in the manner hereinbefore described through function of the control device 56. It will be appreciated that as the temperature of the plate evaporator drops, excess moisture in the air within the compartment 16 migrates to the cold evaporator surfaces and accumulates thereon in the form of frost. Subsequently, as the temperature of the plate evaporator rises, the frost melts and drips off said evaporator surfaces to be removed in any suitable well known manner.

It will be observed that as illustrated at 39 in Figure 1, both the inflow passage 40 and the outflow passage 34 of the plate evaporator 21, and a portion of the main restrictor or capillary tube 37 are disposed in heat exchange relation. This heat exchange arrangement provides for transfer of sufficient heat from the relatively warmer liquid in the capillary passage 37 to the colder refrigerant in the inlet tube 40 to elevate the latter to a temperature above 32° F. In addition, since the heat exchange arrangement includes the plate outlet passage 34, the heat available in the refrigerant flowing through the main restrictor or capillary tube 37 warms said outlet passage and prevents the cooling of the plate 21 which would otherwise occur as a result of the thermal conductivity of said passage 34.

The above-mentioned heat exchange arrangement forms no part of the present invention but is described and claimed in my co-pending application, Serial No. 304,272, filed August 14, 1952. Further description of said heat exchange arrangement therefore is not necessary herein, it being sufficient to state that while this heat exchange arrangement is not essential to the operation of the apparatus of my present invention, it is preferably utilized since it makes it possible for the plate evaporator 21 to rise rapidly and uniformly to its predetermined maximum temperature value.

Referring now to the modified form of the invention illustrated in Figures 3 and 4, it will be noted that the restrictor or capillary tube section 52 discharges into the inlet end of the feed line section 41 and that the restrictor or capillary tube section 54 discharges into the inlet end of the feed line section 40. It will also be noted that, in this modified form, a portion of said main restrictor or capillary tube 37 is disposed in heat exchange relation, as shown at 60, with the extended portion 46 of the branch or leg 45 of the inverted U-tube 44.

The operation of this slightly modified system is the same as the above-described normal operation of the system illustrated in Figure 1, except that the liquid refrigerant in the inverted U-tube 44 is directly affected by the heat of the refrigerant in said main restrictor or capillary tube. In other words, by reason of the fact that the temperature of the refrigerant passing through the main restrictor or capillary tube is higher than the temperature of the refrigerant discharged into the inverted U-tube, the refrigerant at said extended portion 46 is heated by the refrigerant in said capillary tube at the heat exchange point 60. Moreover, because the temperature of refrigerant in said main restrictor or capillary tube is a function of the suction pressure which prevails in the system, which suction pressure in turn is affected by changes in the ambient or room temperature and in the refrigeration load imposed upon the system, the quantity of heat available at said point 60 varies in accordance with said changes. For that reason, the liquid refrigerant in the portion 46 of the inverted U-tube is caused to boil and to percolate to a greater or lesser extent depending on the heat transmitted at said point of heat exchange, so that the level of the liquid refrigerant in said U-tube fluctuates, as is represented at L and L' in Figure 3. As a result, a lesser amount of liquid refrigerant spills into the branch or leg 48 of the inverted U-tube for feeding to the plate evaporator 21 when conditions are such that less refrigeration is needed in compartment 16 because of lower ambient temperatures or lighter refrigeration loads, and a greater amount of liquid refrigerant spills into said branch or leg for feeding to said plate evaporator when conditions are such that more refrigeration is needed in said compartment because of higher ambient temperatures or heavier refrigeration loads.

From the foregoing description, it will be appreciated that the present invention provides simplified refrigerating apparatus which makes it possible to produce and to maintain desired temperature and humidity conditions within a multi-compartment refrigerator without recourse to complicated control instrumentalities, and regardless of changes in ambient temperature and imposed load. Moreover, the arrangement whereby flash gas and liquid refrigerant are caused to separate prior to feeding to the non-freezing evaporator and to the freezing evaporator, and whereby liquid refrigerant is caused, by application of heat, to flow selectively to one or the other of the two evaporators, represents a most simple solution to such objections as excessive moisture condensation on the walls of the non-freezing compartment, accumulation of thick frost on the surfaces of the evaporator associated with said storage compartment, and the necessity of interrupting normal operation of the motor-compressor to effect defrost of said non-freezing evaporator.

I claim:

1. A refrigerating system comprising a first evaporator adapted to effect cooling at temperatures within a predetermined range, a second evaporator adapted to effect cooling at temperatures within another predetermined range and having its inlet end connected with the outlet end of said first evaporator, a condensing unit operable to supply refrigerant for feeding to said evaporators, a liquid refrigerant and flash gas separator adapted to receive refrigerant from said unit prior to feeding to said evaporators, said separator having a lower portion and an upper portion, said lower portion serving to collect liquid refrigerant and communicating with the inlet end of one of said evaporators, said upper portion normally serving to pass flash gas and communicating with the inlet end of the other of said evaporators, a passage establishing open communication between said portions of said separator, and means operable to cause said separator to act as a percolator for raising liquid refrigerant from said lower portion into said upper portion through said passage.

2. A refrigerating system comprising a first evaporator adapted to effect cooling at temperatures within a predetermined range, a second evaporator adapted to effect cooling at temperatures within another predetermined range and having its inlet end connected with the outlet end of said first evaporator, a condensing unit operable to supply refrigerant for feeding to said evaporators, a restrictor having its inlet end connected with the outlet end of said condensing unit, a first feed line section having its outlet end connected with the inlet end of said first evaporator, a second feed line section connected at a point between the outlet of said first evaporator and the inlet of said second evaporator, a liquid refrigerant and flash gas separator connected with the outlet end of said restrictor to receive refrigerant supplied by said condensing unit prior to feeding to said evaporators, said separator having a lower portion and an upper portion, said lower portion serving to collect liquid refrigerant and communicating with the inlet end of one of said feed line sections, said upper portion normally serving to pass flash gas and communicating with the inlet end of the other of said feed line sections, a passage establishing open communication between said portions of said separator, and means operable to cause said separator to act as a percolator for raising liquid refrigerant from said lower portion into said upper portion through said passage, said means being responsive to conditions affecting the cooling effect of said first evaporator.

3. Refrigerating system as set forth in claim 2, in which the mentioned separator is in the form of an inverted generally U-shaped tube, one leg of which is extended to provide the mentioned liquid collecting portion.

4. Refrigerating system as set forth in claim 2, in which the mentioned lower portion of the mentioned separator is connected with the mentioned first feed line section, the mentioned upper portion of said separator is connected with the mentioned second feed line section, and the last mentioned means includes an electrical heater and a thermostatically operated switching device therefor, said heater being disposed in heat exchange relation with said lower portion of said separator, and said switching device having a temperature sensitive element arranged in heat exchange relation with the mentioned first evaporator.

5. Refrigerating system as set forth in claim 2, in which the mentioned lower portion of said separator is connected with the mentioned second feed line section, the mentioned upper portion of said separator is connected with the mentioned first feed line, the mentioned restrictor is in the form of a capillary tube, and the last mentioned means comprises a portion of said capillary tube disposed in heat exchange relation with said lower portion of said separator.

6. A refrigerating system comprising a pair of evaporators connected in series, means for circulating refrigerant to be fed to said evaporators, a separator-percolator device interposed between said means and the first of said evaporators to provide for separation of liquid refrigerant and flash gas flowing from said means, said device normally being operable as a separator and being effective to cause liquid refrigerant to flow directly to said first evaporator and thence to said second evaporator, and said device being operable, under a modified condition of operation when the percolator portion thereof is energized, to cause liquid refrigerant to by-pass said first evaporator and to flow directly to said second evaporator.

7. A refrigerating system comprising a pair of evaporators connected in series, means for circulating refrigerant to be fed to said evaporators, a separator-percolator device interposed between said means and the first of said evaporators and effective to provide for separation of liquid refrigerant and flash gas flowing from said means, said device including a pair of generally vertically disposed branches and a passage communicating with a lower part of one of said branches and with an upper part of the other of said branches, said one of said branches providing a liquid refrigerant collecting chamber and being normally operable to cause liquid refrigerant to flow directly from said chamber to one of said evaporators, and means operable, under a modified condition of operation, to apply heat to said device at a point to cause said passage to act as a percolator to effect flow of liquid refrigerant through said passage into the other of said branches and thence directly into the other of said evaporators.

8. Refrigeration apparatus comprising a refrigerator cabinet having separate compartments, a first evaporator in heat exchange relation with one of said compartments and adapted to cool said one of said compartments at temperatures within a predetermined range, a second evaporator in heat exchange relation with the other of said compartments and adapted to cool said other of said compartments at temperatures within another predetermined range, a condensing unit operable to supply refrigerant for feeding to said evaporators, a liquid refrigerant and flash gas separator connected with said unit to receive refrigerant prior to feeding to said evaporators, said separator having a lower portion and an upper portion, said lower portion serving to collect liquid refrigerant and communicating with one of said evaporators, said upper portion normally serving to pass flash gas and communicating with the other of said evaporators, a passage establishing open communication between said portions of said separator, and means operable to cause said separator to act as a percolator for raising liquid refrigerant from said lower portion into said upper portion through said passage, said means being responsive to conditions affecting the cooling of said one compartment.

9. A device for controlling the flow of refrigerant in a refrigerating system of the kind having a pair of evaporators and a condensing unit to supply refrigerant for feeding to said evaporators, said device comprising a liquid refrigerant and flash gas separator having a lower portion providing a liquid trap and an upper portion providing a flash gas passageway, inlet means opening into said separator to provide for the flow of refrigerant to said separator from said unit, outlet means opening out of said separator to provide for the flow of liquid refrigerant from said trap to one of said evaporators, other outlet means opening out of said separator to provide for the flow of flash gas from said passageway to the other of said evaporators, a passage establishing open communication between said portions of said separator, and means disposed in heat exchange relation with said lower portion of said separator and operable to apply heat to said lower portion thereby causing said separator to act as a percolator for raising liquid refrigerant from said lower portion into said upper portion through said passage.

10. A device for separating liquid refrigerant and flash gas in a refrigerating system of the kind having a pair of evaporators, and for controlling the flow of said liquid refrigerant and flash gas through said evaporators; said device comprising a liquid refrigerant and flash gas separator provided with two downwardly directed portions, an inlet located in one of said portions to pass a mixture of liquid refrigerant and flash gas into said tube wherein flash gas rises and enters the other of said portions and liquid refrigerant accumulates in said one of said portions, an outlet disposed in an upper part of said one of said portions to pass liquid refrigerant out of said tube to one of the evaporators, another outlet disposed in said other of said portions to pass flash gas from said tube to the other of the evaporators, a conduit connected to a lower part of said one of said portions and to an upper part of said other of said portions at a point above the outlet in said one of said portions, and means operable to apply heat to said tube at a point adjacent its connection with said conduit.

11. A refrigerating system comprising a pair of evaporators connected in series, a condensing unit receiving evaporated refrigerant from said evaporators and delivering condensed refrigerant for feeding to said evaporators, flow control means including a loop of tubing having two elongated generally vertical portions with their lower ends interconnected in continuously open communication providing for a column of liquid refrigerant within said portions, means defining a pair of passages, one of said passages leading to one of said evaporators from one of said portions of said loop at a level below that of said column, the other of said passages leading to the other of said evaporators from the other of said portions of said loop at a level above that of said column, a conduit leading to said loop from said condensing unit to deliver refrigerant to said loop so that liquid refrigerant flows normally through said one of said passages into said one of said evaporators and then into said other of said evaporators in series, and means for supplying heat to said other of said portions of said loop so that liquid refrigerant flows through said other of said passages directly into said other of said evaporators and said column is so affected that liquid refrigerant no longer flows to said one of said evaporators.

12. In a refrigerating system including a condensing unit adapted to feed liquid refrigerant, means defining a passage for refrigerant fed from said unit and including an evaporator, means defining an alternative passage for refrigerant fed from said unit and disposed to bypass said evaporator, and control means for transferring flow of liquid refrigerant from said first-mentioned passage to said alternative passage; said control means comprising a loop of tubing mounted generally vertically to provide a column of liquid refrigerant within two upstanding intercommunicating portions of said loop, one of said portions having an outlet disposed at a level to be fed by said column and communicating with said first-mentioned passage, the other of said portions having an outlet disposed above said column and communicating with said alternative passage, said loop having an inlet communicating with said condensing unit to deliver refrigerant into said portions so that liquid refrigerant flows normally out of said outlet of said one of said portions into said first-mentioned passage, and means for supplying heat to said other of said portions so that liquid refrigerant flows out of said outlet of said other of said portions into said alternative passage and said column is so affected that liquid refrigerant no longer flows out of said outlet of said one of said portions.

References Cited in the file of this patent

UNITED STATES PATENTS

| Number | Name | Date |
| --- | --- | --- |
| 2,133,957 | Harshberger | Oct. 25, 1938 |
| 2,133,963 | McCloy | Oct. 25, 1938 |
| 2,426,578 | Tobey | Aug. 26, 1947 |
| 2,459,173 | McCloy | Jan. 18, 1949 |
| 2,576,663 | Atchison | Nov. 27, 1951 |
| 2,598,408 | McCloy | May 27, 1952 |
| 2,604,761 | Atchison | July 29, 1952 |
| 2,607,200 | Shoemaker | Aug. 19, 1952 |
| 2,622,407 | Bixler | Dec. 23, 1952 |